United States Patent [19]

Pollard

[11] Patent Number: 5,378,282
[45] Date of Patent: Jan. 3, 1995

[54] ROBOTIC TOOL MANIPULATING APPARATUS

[76] Inventor: Willard L. Pollard, 211 Pasadena Ave. N., St. Petersburg, Fla. 33710

[21] Appl. No.: 82,714

[22] Filed: Jun. 28, 1993

[51] Int. Cl.$^6$ .............. B05C 11/00; B25J 11/00; B25J 17/02
[52] U.S. Cl. .................. 118/697; 118/698; 118/323; 901/23; 901/29; 901/43; 74/490.06
[58] Field of Search ............... 118/696, 697, 698, 323; 901/14, 23, 25, 29, 43; 414/749; 74/479 B, 479 BJ, 479 BW

[56] References Cited

U.S. PATENT DOCUMENTS

| | | | |
|---|---|---|---|
| 4,407,625 | 10/1983 | Shum | 901/14 X |
| 4,806,068 | 2/1989 | Kohli et al. | 901/23 X |
| 4,819,496 | 4/1989 | Shelef | 901/29 X |
| 5,266,115 | 11/1993 | Taccon et al. | 118/696 X |

Primary Examiner—Robert J. Warden
Assistant Examiner—E. Leigh Dawson

[57] ABSTRACT

Three traveling blocks confined to rectilinear paths are propelled to and fro in those paths in coordinated programs of motion by program-controlled motors. A leg member for each of said blocks is flexibly connected at one of its ends to its respective traveling block. The three legs are flexibly interconnected at locations on the legs away from the blocks. The three legs combine the programmed rectilinear movements of the blocks to produce a corresponding programmed three-dimensional movement of a tool carried by one of said legs.

3 Claims, 5 Drawing Sheets

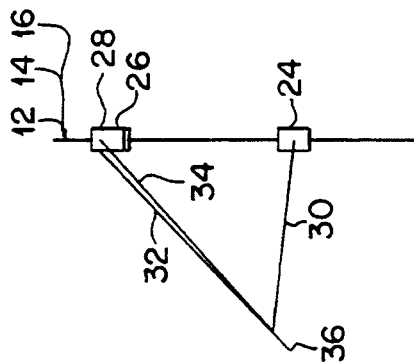
FIG. 2.2
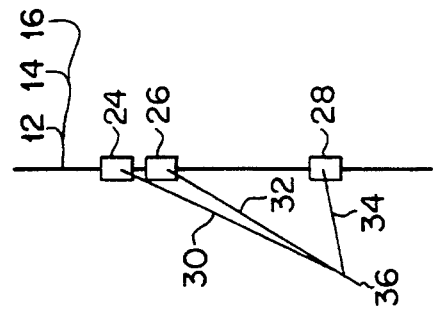
FIG. 2.4
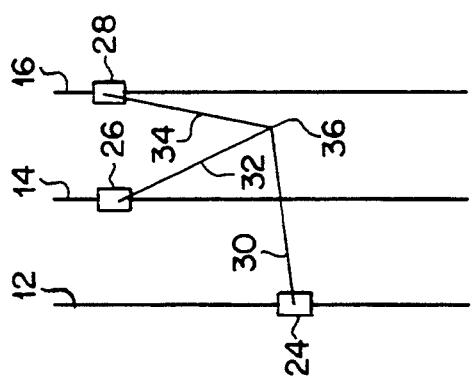
FIG. 1.2
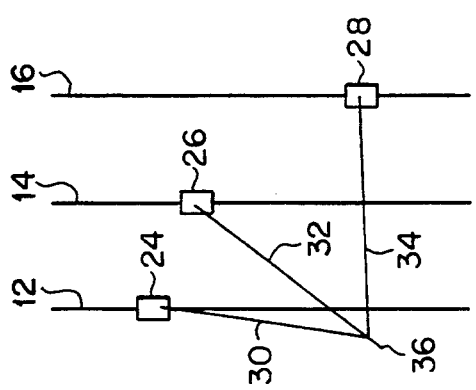
FIG. 1.4
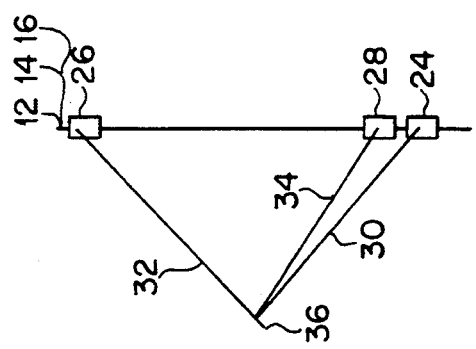
FIG. 2.1
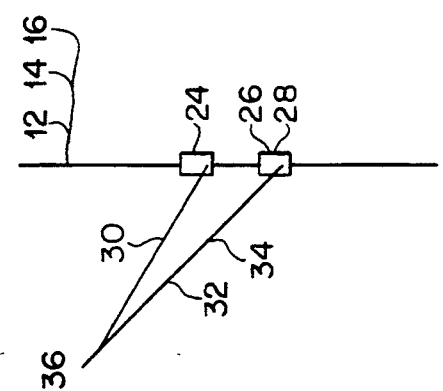
FIG. 2.3
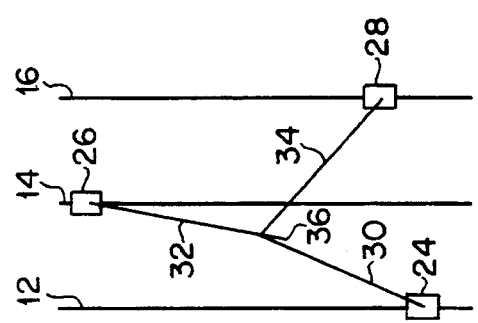
FIG. 1.1
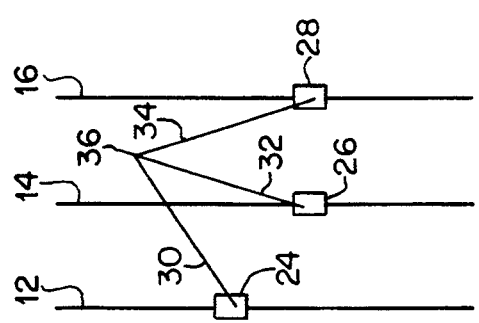
FIG. 1.3

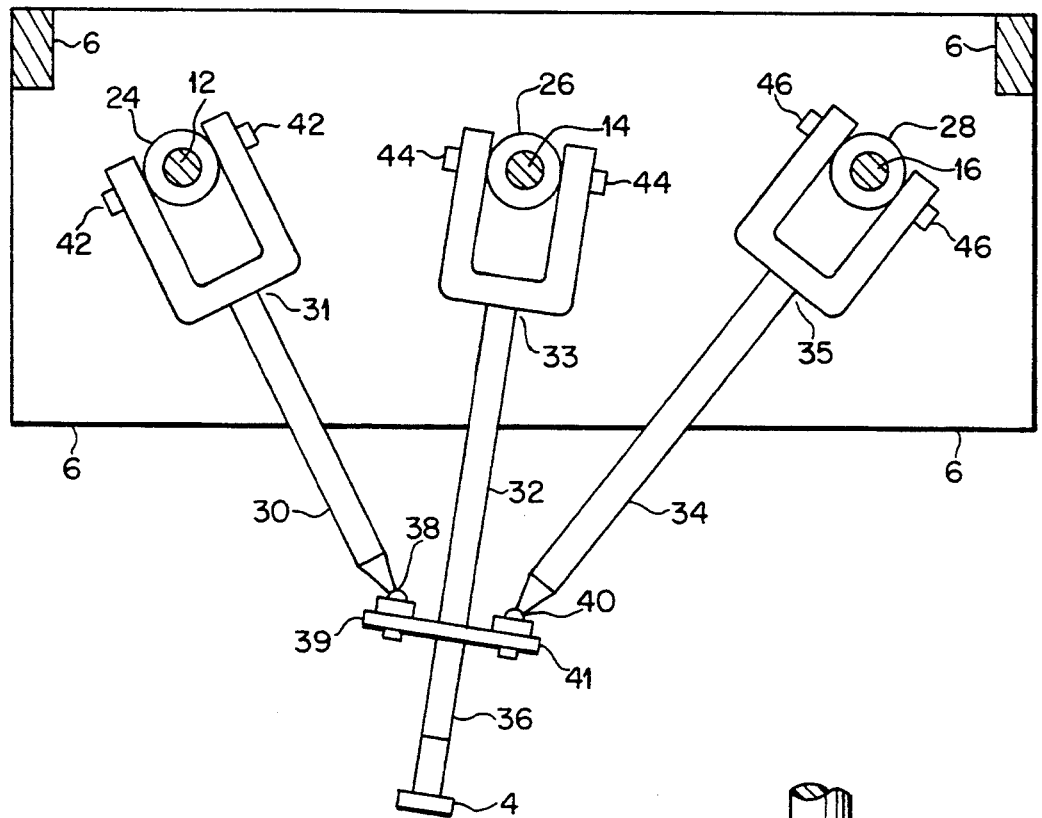
FIG. 3
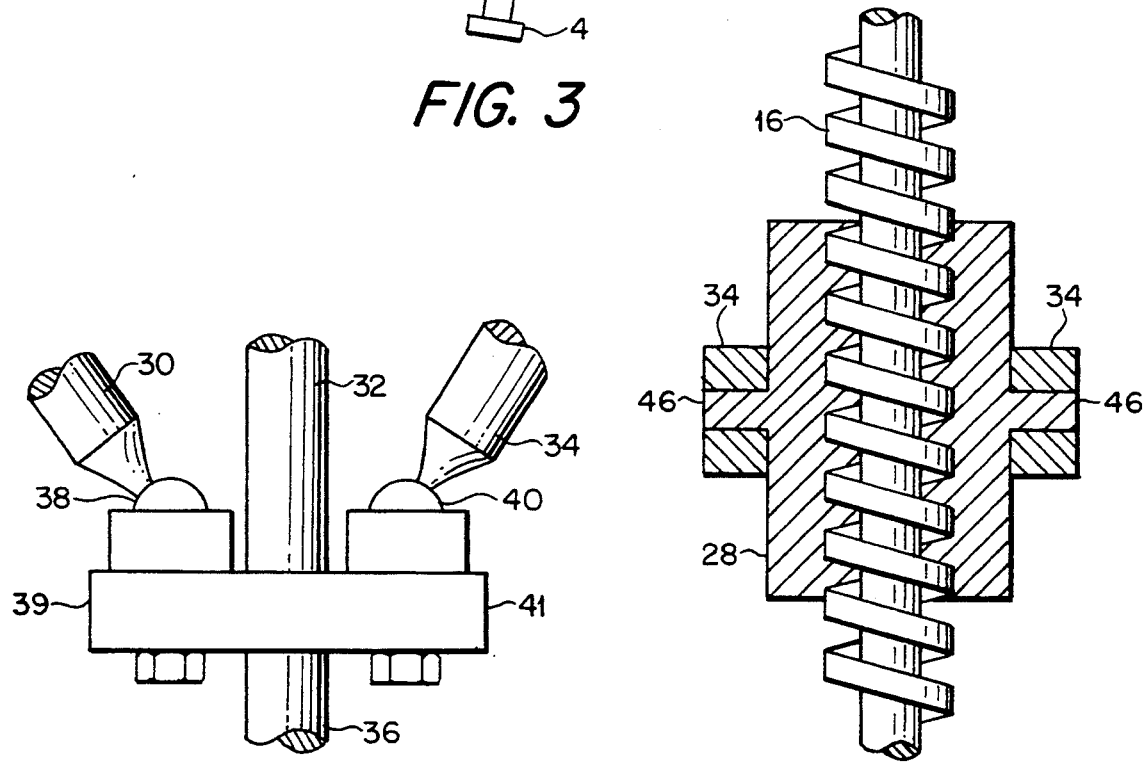
FIG. 4
FIG. 5

ROBOTIC TOOL MANIPULATING APPARATUS

PRIOR ART AND OBJECTS OF THE INVENTION

Main-stream robots emulate the human arm, with heavy-duty precision-machined gearing to operate the "shoulder" and "elbow" joints. The "elbow" motors are particularly troublesome in that they are heavy objects which are carried outboard and add strain and load to the "shoulder". These difficulties have been overcome in part in U.S. Pat. Nos. such as Pollard 2,213,108 and 2,286,571, Shum 4,407,625 and Van Deberg 4,435,116, involving tripod-like structures, the legs of which are manipulated to produce three-dimensional movement of the juncture of the legs of the tripod. Pollard machines still require "shoulder" motors; the other cited machines require two-degree-of-freedom swiveling mounts for the operating motors. All of the prior machines discussed require that the areas behind the machines be kept clear of obstructions and of intrusions by personnel.

OBJECTS OF THE INVENTION

Accordingly, it is one object of the invention to minimize the use of heavy-duty precision-machined components in robot apparatus. As will be seen below, in the preferred embodiment of the invention, the sole outboard machined objects are simple threaded shafts, their mating threaded blocks and simple hinges. The space behind, the apparatus does not need to be kept clear of obstructions or personnel. If it is desired to adapt the equipment to some special configuration, this can be done by simply replacing legs for one application with shorter or longer, or appropriately curved, legs.

IN THE DRAWINGS

FIG. 1 is a vertical front view of the apparatus.

FIG. 2 is a vertical side view of the apparatus of FIG. 1, seen from the right Portions of screws 12, 14 and 16 are broken away to reveal the positions of blocks 26 and 28.

FIGS. 1.1 to 1.4 are skeletonized versions of FIG. 1 showing successive configurations of the apparatus.

FIGS. 2.1 to 2.4 are skeletonized versions of FIG. 2 showing successive configurations of the apparatus corresponding respectively to FIGS. 1.1 to 1.4.

FIG. 3 is a top view of the apparatus of FIG. 1, with the structure sectioned away above the plane of lines 3—3 of FIGS. 1 and 2.

FIG. 4 is an enlarged view of the flexible connections between the legs 30, 32 and 34 of FIGS. 1 to 3.

FIG. 5 shows an enlarged detailed sectional view of the traveling block 28 of FIGS. 1 to 3.

Figure 1:
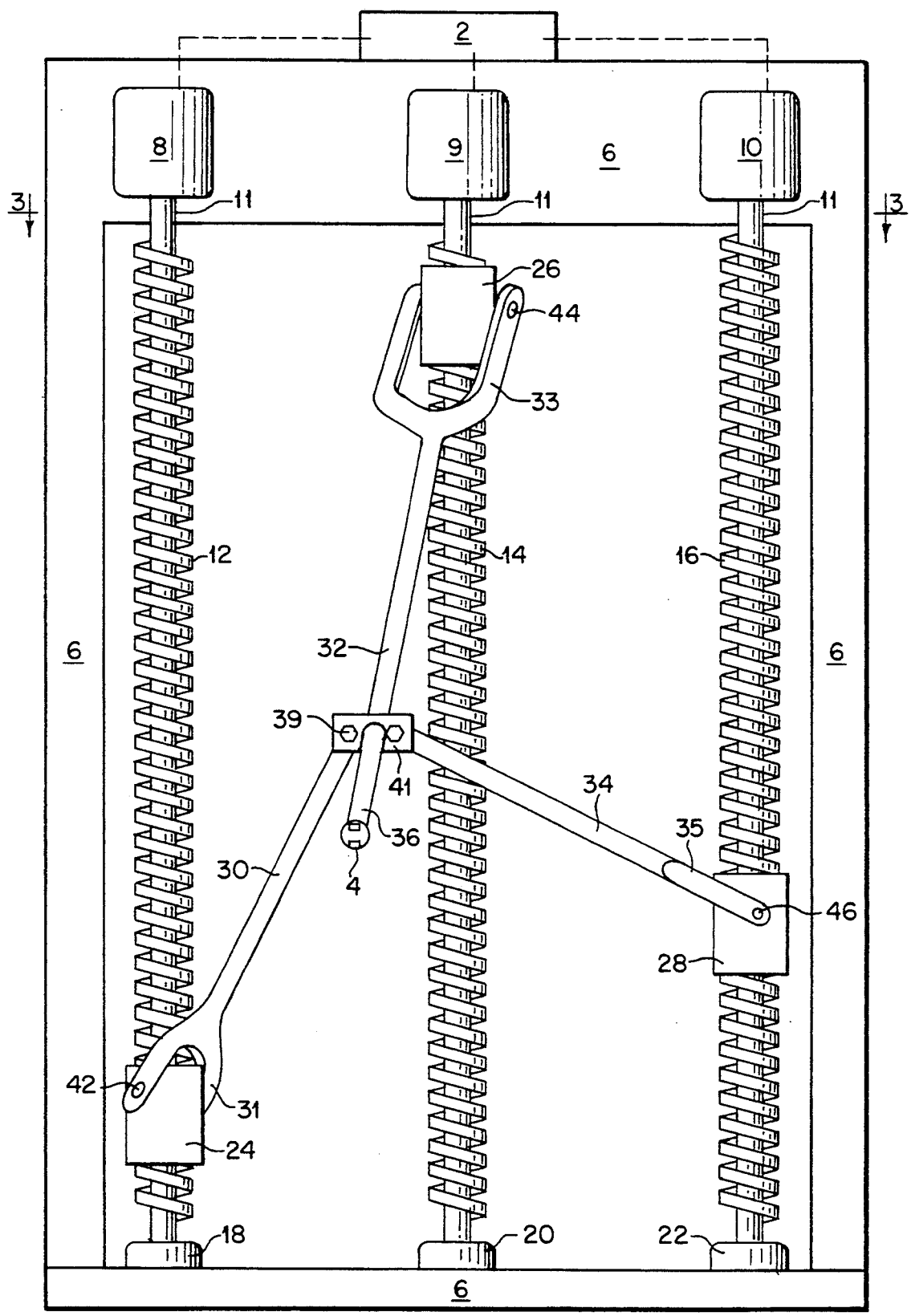

The apparatus shown in FIGS. 1 to 5 is a system of linkage whereby an automatic program generated by a program control box 2 is imparted to a tool 4 (such as a spray gun) to move the tool 4 about to perform a task (such as painting an automobile). The apparatus more particularly comprises a fixed frame 6 having three remotely controllable motors (such as stepping motors) 8, 9 and 10 mounted thereon. The program control box 2 generates signals which cause the motors to execute predetermined coordinated programs of rotation. The shafts 11 of the motors 8, 9 and 10 are prolonged as screw-threaded portions 12, 14 and 16 respectively, and the lower ends of the shafts are journalled in thrust bearings 18, 20 and 22 mounted on the bottom of the frame 6. Threaded upon each of the screw-threaded portions 12, 14 and 16 respectively are traveling blocks 24, 26 and 28, which are internally threaded to mate with the threaded portions 12, 14 and 16. This is shown in detail in FIG. 5 with respect to the block 28; the arrangement is identical in the case of the other blocks 24 and 26. As will appear below, the blocks are restrained in their rotary motion, so that the programmed rotation imposed by the motors 8, 9 and 10 upon the threaded shaft portions 12, 14 and 16 propel the blocks rectilinearly in accordance with individual and coordinated programs imposed upon the motors 8, 9 and 10 by the program box 2.

The three individually programmed linear movements of blocks 24, 26 and 28 are combined to move the tool 4 in a programmed three-dimensional path by means of a tripod-like assembly of three legs 30, 32 and 34. The central leg 32 carries the tool 4 on an extension 36, and the two side legs 30 and 34 are connected to the leg 32 by ball-and-socket joints 38 and 40 mounted on ears 39 and 41 projecting from the leg 32 (FIG. 4). The ends of the legs 30, 32 and 34 remote from the joints 38 and 40 are bifurcated at 31, 33 and 35 to embrace the blocks 24, 26 and 28, and are hinged thereto by pintles 42, 44 and 46 projecting from the blocks (as shown in detail in FIG. 5, for block 28) so that the legs are free to swing up and down, while at the same time restraining the rotary motion of the blocks 24, 26 and 28, so that they, and the bifurcated leg-ends 31, 33 and 35 will be driven up and down by the rotation of the screw-threaded portions 12, 14 and 16, each according to an individual program coordinated with the programs of the other legs as imposed by the program box 2. These programmed individual linear up and down movements are combined, at the juncture of the three legs 30, 32 and 34 at the ball-and-socket joints 38 and 40, to impart to the tool 4 a corresponding three-dimensional movement programmed by the box 2 to carry out whatever task it may be desired that the tool 4 should perform.

This will be seen in FIGS. 1.1 to 1.4, and 2.1 to 2.4, which are skeletonized representations of the apparatus of FIG. 1, moved into different configurations by the programmed motions of the blocks 24, 26 and 28 imposed by the program box 2. The screws 12, 14 and 16, and the tripod legs 30, 32 and 34 have been stripped down and represented by simple lines.

Figure 2:
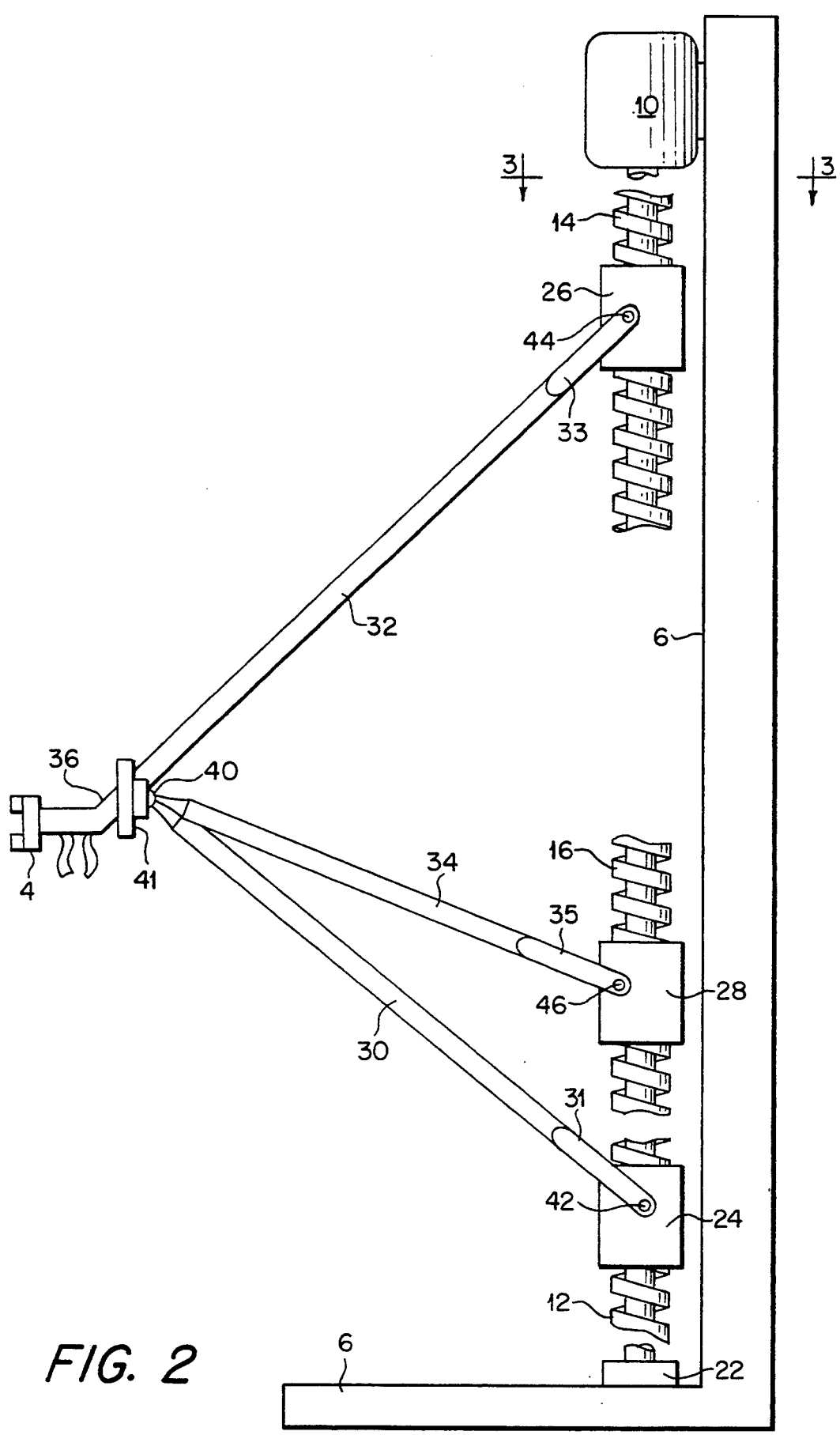

FIGS. 1.1 and 2.1 reproduce the configuration of FIGS. 1 and 2 respectively. FIGS. 1.2 and 2.2 represent the configuration of the apparatus after the program imposed by the box 2 has progressed, and the blocks 24, 26 and 28 have been moved to new positions by the programmed rotation of the screws 12, 14 and 16. The juncture of the legs 30, 32 and 34, and consequently the position of the tool-carrying extension 36 has thereby been moved upward and to the right of the position of FIGS. 1.1 and 2.1. Still further programmed movement of the traveling blocks to the positions shown in FIGS. 1.3 and 2.3 move the tool-carrying extension 36 to a position higher than shown in FIGS. 1.1 and 2.1. Further programmed motion of the blocks the positions of FIGS. 1.4 and 2.4 bring the tool carrier 36 to a position far to the left and closer to the plane of the screws 12, 14 and 16 than in FIGS. 1.1, 2.1, 1.2, 2.2, 1.3 and 2.3. Thus, by suitable programming of the rotation of the screws 12, 14 and 16 by the program box 2, any desired positioning and motion of the tool-carrying extension 36 and of the tool 4 may be automatically and repetitively carried out.

DISCUSSION OF THE PREFERRED EMBODIMENT

It will be seen that the preferred embodiment above described requires a very minimum of precision-machined elements, viz., the screw elements 12, 14 and 16, which are by far the simplest to machine, most accurate and freest from backlash of all machined elements. Accuracy of positioning can be increased as desired by reducing the pitch of the screw threads. The reach of the apparatus in the direction of the screw axes is limited only to the length of the screws that is compatible with the lateral stiffness of the screws required in the particular application. If stiffness is a problem due to the length of the screws, it can be solved in most applications by increasing the diameter of the screws, making them hollow if weight or angular moment of inertia are problems. Reverting to the extended reach capabilities of the apparatus, it might, for instance, be desired to construct a household wall-clearing machine to clean from floor to ceiling while operating in close quarters. To cover such a range with the usual shoulder-humerus-ulna machine would require very long arms which would sweep out tremendous areas around the behind the machine. With the arrangement of FIGS. 1 etc., the screws 12, 14 and 16 can be made long enough to carry the tool from floor to ceiling while using relatively short arms 30, 32 and 34, sides that the machine could operate close to the wall, while leaving the areas to the sides and behind the machine free for other structures or for traffic.

Assuming that considerable numbers of the apparatus to are made, the manufacturer of the machines could provide a few standard configurations of the frame 6, motors 8, 9 and 10 and screws 12, 14 and 16 which can be adapted to specific tasks by providing legs 30, 32 and 34 of special lengths and/or shapes appropriate to those tasks. For instance, it may be desired that the tool intrude into hollow portions of a workpiece; to this end, the extension 36 can be lengthened, and/or the legs 30, 32 and 34 bowed inwardly towards each other. In most cases will be desirable that the legs have their interconnections be spaced fairly close together as at 39 and 41; but in some applications it might be desirable that one or both of the ears 39 and 41 be quite wide; or it might be that space or other considerations would dictate that the swiveling connections of the legs 30 and 34 be at substantially different points along the leg 32. The topological criteria are that the swiveling connections between the legs permit any leg of the assembly to assume any angle with respect to any other leg, and that the interconnections be remote from the connections of the legs to the blocks 24, 26 and 28.

It will usually be most practical to arrange the screws 12, 14 and 16 parallel to each other and in a single plane as shown in FIGS. 1–3. However, in special situations it may be desirable to place the screws outside of a single plane and/or set their axes at different angles to each other and/or to the perpendicular; for instance, if the central screw 14 is tipped backward from the plane of the other screws, the up-and-down tipping range of the central leg 32 will be enhanced.

The simple hinging of the legs 30, 32 and 34 to the blocks 24, 26 and 28 by means of the pintles 42, 44 and 46 obviates many complications. (A hinged connection between two objects may be defined as one permitting only one degree of rotational motion between the objects, and preventing any translational movement, at the axis of rotational motion, of the objects with respect to each other.) The spatial position of the tool 4 geometrically determines the angular positions of the blocks 24, 26 and 28, so that it is not necessary to provide separate means (e.g., the slideway of FIGS. 7 and 8 described below) to restrain the blocks 24, 26 and 28 from rotationally, following the rotation of the screws 12, 14 and 16. Thus, the blocks 24, 26 and 28 are free from any restraint of rotary motion about the axes of the screws 12, 14 and 16, other than that provided by their hinged connections to the tripod-like assembly of the legs 30, 32 and 34. With regard to the showing of the hinging of the legs by the pintles 42, 44 and 46 which project from the sides of the blocks with their axes horizontal and passing through the axes of their respective associated screws 12, 14 and 16, this arrangement provides a wide spacing of the bearing points and a greater stability and diminished backlash with respect to the blocks. However, special situations may dictate other configurations, for instance with legs 30, 32 and 34 not bifurcated and embracing the blocks, but simply hinged to the sides of the blocks facing the junctions of the legs at 39 and 41. Nor need the axes of hinging be perpendicular to the axes the screws; the topological criterion in this regard is that the axis of hinging be non-parallel to the axes of the associate screws. It is expected that for most practical purposes the axis of hinging would be at an angle of at least 45 degrees to the axis of the associated screw.

VARIATIONS

Figure 6:
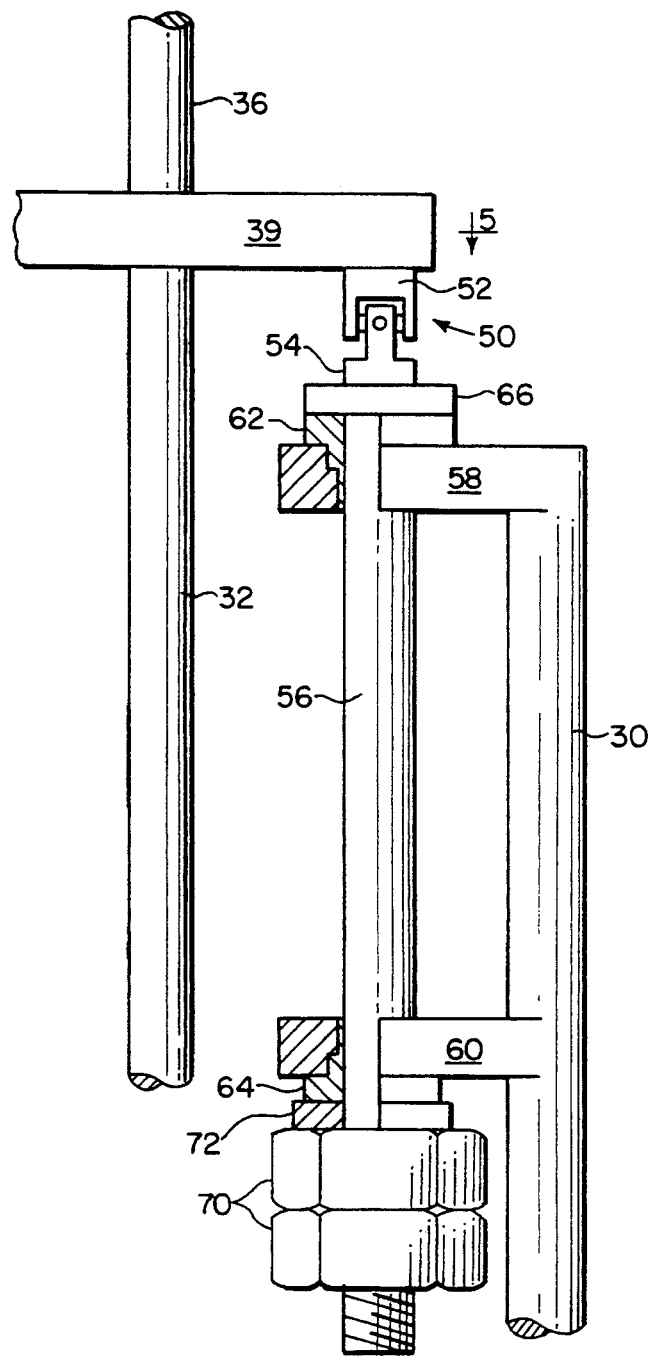
FIG. 6 shows an alternative to the ball-and-socket joints of FIGS. 1 to 3.

In some applications, the simple ball-and-socket joints 38 and 40 may provide inadequate strength and/or range of motion. In such cases the arrangement of FIG. 6 may be employed. In this construction the ball-and-socket joint 38 is replaced by a cardan joint indicated at 50, one fork 52 of the joint being mounted on the ear 39 of the leg 32, and the other fork 54 being extended as a shaft 56 passing through openings in the ears 58 and 60 protruding from the leg 30. Bushings 62 and 64 are provided in the openings of the ears 58 and 60 to permit the shaft 56 to rotate about its axis with respect to ears 58 and 60. In order to restrain linear axial movement of the shaft 56 which respect to the ears 58 and 60, a flange 66 is formed on the shaft 56 which bears on the outer face of the bushing 62. At the other end of the shaft 56 a pair of locknuts 70 hold a washer 72 against the outer face of the bushing 64. Thus, three degrees of freedom of rotary movement are permitted between the leg 32 and let 30 while axial movement of the leg 30 is restrained, just as in the case of the ball joint 40.

Figure 7:
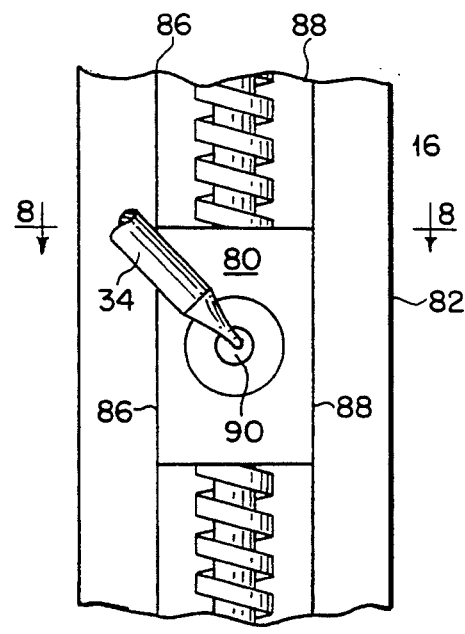
FIG. 7 shows a vertical front view of an alternative mechanism for moving the traveling blocks 24, 26 and 28 of FIGS. 1 to 3.
Figure 8:
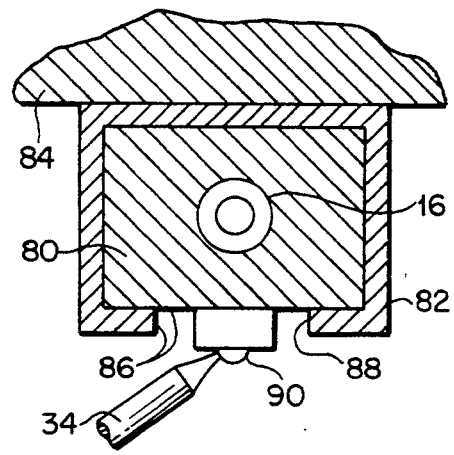
FIG. 8 is a horizontal section on the line 8—8 of FIG. 7.

In some applications it may happen that the screws 12, 14 and 16 cannot be made rigid enough to resist thrust from the legs 30, 32 and 34. For instance, it may be desired to orient the apparatus with the screws 12, 14 and 16 set horizontally, and extended for a considerable length so as to be capable of serving a substantial section of a production conveyor line. An arrangement to avoid sagging in such installations is shown in FIGS. 7 and 8, wherein the traveling block 28 is replaced with a block 80 of square cross-section (FIG. 8) embraced and guided in a generally C-shape-cross-sectioned slideway 82 mounted on a fixed wall 84. The screw 16 is threaded into the block 80 so that it is propelled to and fro in the slideway by the motor 10 in accordance with the program dictated by the program box 2. The slideway 82 has a lengthwise gap from 86 to 88 on the front side to allow ball-and-socket joint 90 secured to the block 80 to protrude outside the slideway as the block moves to an fro therein. The joint 90 is connected to the end of the leg 34 remote from its connection with the other legs 30 and 32, and interacts with those legs to produce programmed three-dimensional movement of the tool 4 as described in connection with FIGS. 1-3.

It will be understood that the ball-and-socket joint 90 may be replaced with any type of flexible connection, such as a cardan joint, and in the case of the central leg 32 a cardan joint would be preferred, since it provides only two degrees of rotary movement, thus stabilizing this leg against twisting motion. It will also be understood that the cross-section of the block 80 and slideway 82 need not be rectangular, but could of any non-circular shape that would prevent rotation of the block as the screw 16 revolves.

I claim:

1. Apparatus for automatically moving a tool in a predetermined program of motion in three dimensions comprising:

a frame;

a control signal generator producing three individual coordinated programs A, B and C of motion control signals;

three screw-threaded shafts M, N, and O journalled in bearings mounted on said frame and separated from each other;

three signal-controlled motors D, E and F connected to receive respectively the programs A, B and C and to rotate the shafts M, N, and O correspondingly to said programs, the shafts M, N, and O being connected to be rotated by said motors D, E and F respectively;

three traveling blocks G, H and I having female screw threads formed therein and threaded respectively onto the threads of the shafts M, N and O, so as to be propelled to and fro in rectilinear paths along the axes of, and proportionately to the rotations of, the shafts M, N and O respectively;

three leg members J, K and L each connected at one end to a respective one of the blocks G, H and I by a respective on of three rotational hinge connections P, Q and R; · said leg members J, K and L being connected together by rotational connections at locations thereon remote from their respective rotational hinge connections P, Q and R to the blocks G, H and I;

a tool supported by the leg member J at a location thereon remote from the rotational hinge connection P;

said rotational hinge connections P, Q and R having axes of rotation U, V and W respectively, and confining the relative rotational motion between each one of the respective leg members J, K and L and its corresponding respective one of the blocks G, H and I exclusively to rotational motion about its corresponding respective one the axes U, V and W;

each of the axes U, V and W being disposed at an angle of at least 45 degrees to the axis of its corresponding respective one of the shafts M, N and O;

each of the rotational hinge connections P, Q and R being the sole rotational connection between its respective one of the leg members J, K and L and its corresponding respective one of the blocks G, H and I;

each of said leg members J, K, and L being free and unconfined to rotate about an axis at an angle of at least 45 degrees to the axis of its corresponding respective one of the shafts M, N, and 0; and each of said blocks G, H, and I being free and unconfined, except as constrained by its respective one of the rotational hinge connections P, Q, and R to the assemblage of the leg members J, K, and L, to rotate about an axis parallel to the axis of its corresponding respective one of the shafts M, N, and O.

2. Apparatus for automatically moving a tool in a predetermined program of motion in three dimensions comprising:

a control signal generator producing three individual coordinated programs A, B and C of motion control signals;

three signal-controlled motors D, E and F having shafts and connected to receive respectively the programs A, B and C and to rotate their shafts correspondingly to said programs;

three traveling blocks G, H and I;

means for guiding said blocks each in a rectilinear path separate from the paths of the other blocks, and for mechanically connecting the shafts of the motors D, E and F to the blocks G, H and I so as to propel the blocks to and fro in said paths, each proportionately respectively to the rotations of the shafts of the motors D, E and F;

three leg members J, K and L connected respectively at one end to the blocks G, H and I by rotational connections;

each of said leg members J, K and L being free and unconfined, except as constrained by its respective one of the rotational connections to the assemblage of the leg members J, K, and L, to rotate, at the end thereof adjacent its respective one of the blocks G, H and I, about an axis parallel to the direction of rectilinear motion of its respective one of the blocks G, H and I, and each of said leg members J. K and L, also being free and unconfined, except as constrained by its respective one of the rotational connections to the assemblage of the leg members J, K, and L, to rotate at the end thereof adjacent its respective one of the blocks G, H and I, about an axis at an angle of at least 45 degrees to the direction of rectilinear motion of its respective one of the blocks G, H and I said leg members being connected together by rotational connections at locations thereon remote from their connections to the blocks G, H and I; and a tool supported by the leg J at a position remote from its connection to the block G.

3. Apparatus according to claim 2, wherein the blocks are embraced and guided by rectilinear slideways.

* * * * *